No. 791,137. Patented May 30, 1905.

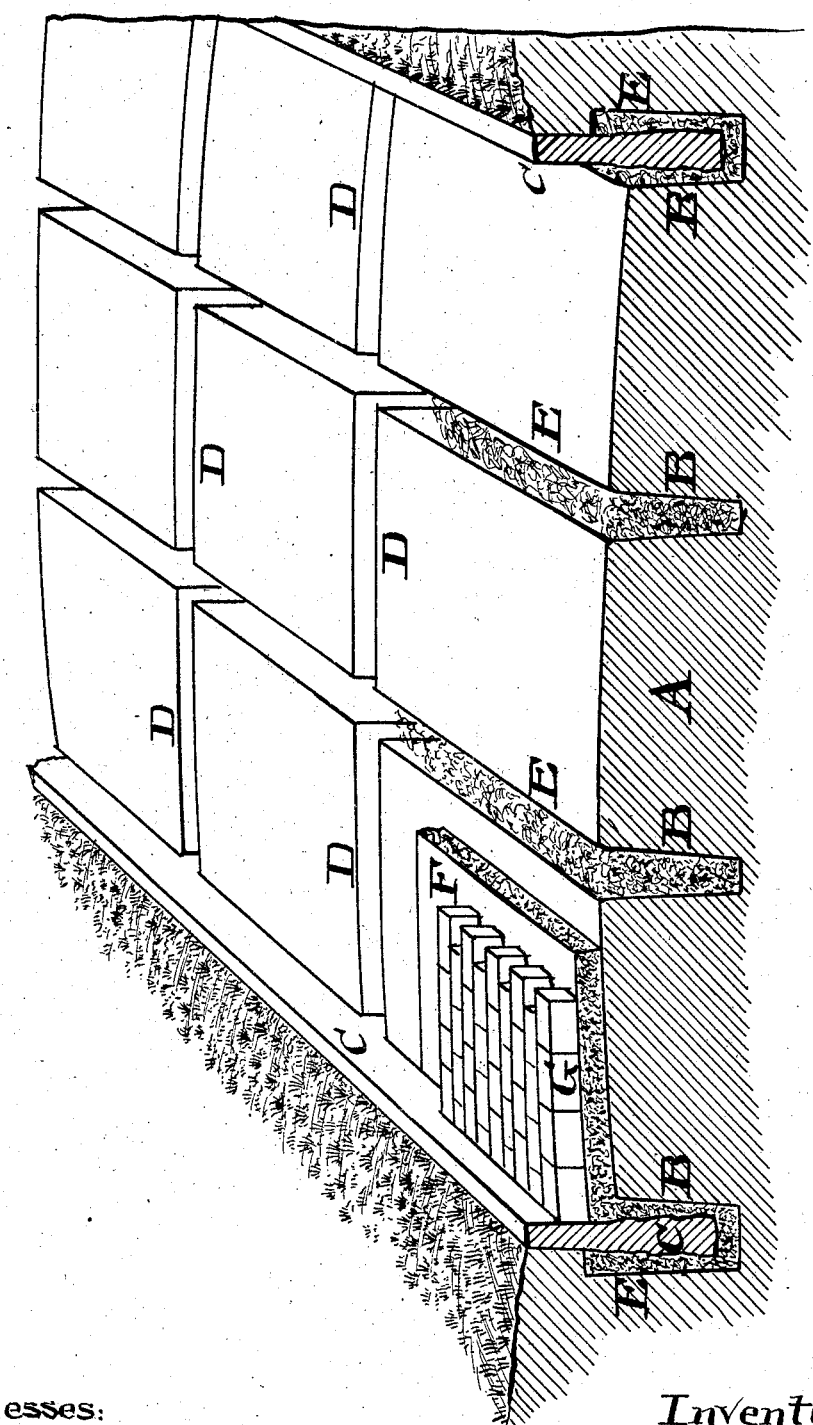

UNITED STATES PATENT OFFICE.

FRANK E. CUDELL, OF CLEVELAND, OHIO.

PAVEMENT.

SPECIFICATION forming part of Letters Patent No. 791,137, dated May 30, 1905.

Application filed October 24, 1904. Serial No. 229,770.

*To all whom it may concern:*

Be it known that I, FRANK E. CUDELL, a citizen of the United States of America, and a resident of Cleveland, Cuyahoga county, State of Ohio, have invented certain new and useful Improvements in Pavements, of which the following is a specification.

This invention relates to pavements; and it consists in the peculiar construction and preparation of the clay bottom for the laying of the pavement thereon.

The object of this improvement is the prevention of the cracking of cemented brick and stone pavements by the heaving of the clay bottom by frost.

The figure in the accompanying drawing is a perspective view of a road-bed prepared in accordance with my improvement.

A represents a bed of clay upon which a cement grouted pavement of brick or stone is to be laid.

B B and D D are grooves cut in the clay to be filled with a loose material, such as sand, gravel, ashes, or cinders.

C C are curbstones placed in the side grooves B B at the side of the road-bed. Over the said road-bed is placed a covering of loose material, such as sand or gravel, rolled down ready to receive surface paving brick or stone G.

By this method of construction the clay bottom has freedom to expand sidewise, and the expansion upward will be uniform the entire width of the pavement and reduced to the minimum, and thus avoiding the liability of heaving and cracking of the pavement laid thereon.

What I claim, and desire to secure by Letters Patent, is—

In a road-bed of the type described, the combination of a bed divided into blocks by a series of grooves, a loose material filling said grooves, a loose material covering said bed and filling, and a pavement supported on said bed and filling, substantially as described.

Signed by me at Cleveland, Ohio, this 21st day of October, 1904.

FRANK E. CUDELL.

Witnesses:
GEO. W. TIBBITTS,
E. A. TIBBITTS.